(12) United States Patent
Reveles et al.

(10) Patent No.: US 9,989,088 B2
(45) Date of Patent: Jun. 5, 2018

(54) LINEAR BEARING

(71) Applicant: OXFORD SPACE SYSTEMS LIMITED, Oxfordshire (GB)

(72) Inventors: Juan Reveles, Oxfordshire (GB); Vincent Fraux, Oxfordshire (GB)

(73) Assignee: OXFORD SPACE SYSTEMS LIMITED, Oxfordshire (GB)

( * ) Notice: Subject to any disclaimer, the term of this patent is extended or adjusted under 35 U.S.C. 154(b) by 7 days.

(21) Appl. No.: 15/304,578

(22) PCT Filed: May 14, 2015

(86) PCT No.: PCT/GB2015/051424
§ 371 (c)(1),
(2) Date: Oct. 17, 2016

(87) PCT Pub. No.: WO2015/173573
PCT Pub. Date: Nov. 19, 2015

(65) Prior Publication Data
US 2017/0051787 A1    Feb. 23, 2017

(30) Foreign Application Priority Data

May 15, 2014   (GB) .................................. 1408622.7

(51) Int. Cl.
| F16C 27/02 | (2006.01) |
| F16C 29/00 | (2006.01) |
| F16C 29/02 | (2006.01) |
| F16C 41/00 | (2006.01) |

(52) U.S. Cl.
CPC ............ *F16C 29/002* (2013.01); *F16C 29/02* (2013.01); *F16C 41/00* (2013.01); *F16C 2233/00* (2013.01)

(58) Field of Classification Search
CPC .... F16C 33/784; F16C 33/78; F16C 33/7813; F16C 33/7823; F16C 29/002; F16C 29/02; F16C 41/00; F16C 2233/00
See application file for complete search history.

(56) References Cited

U.S. PATENT DOCUMENTS

| 1,004,939 A | * | 10/1911 | Thorn ..................... F16C 27/02 |
| | | | 29/450 |
| 3,929,392 A | * | 12/1975 | Ogino .................... F16C 17/02 |
| | | | 384/215 |
| 4,208,075 A | * | 6/1980 | Templeton .............. F16C 29/02 |
| | | | 384/29 |

(Continued)

FOREIGN PATENT DOCUMENTS

| DE | 102009011045 | 9/2010 |
| GB | 1420465 | 1/1976 |
| WO | WO 03/078855 | 9/2003 |

*Primary Examiner* — Thomas R Hannon
(74) *Attorney, Agent, or Firm* — Law Offices of Steven W. Weinrieb

(57) ABSTRACT

A linear bearing (1) includes a collar (2) arranged to receive a shaft (30) therethrough. The linear bearing (1) also has at least one resiliently sprung member (12) mounted within the collar (2) that contacts the shaft (30) when the shaft (30) is mounted inside the collar (2). The at least one resiliently sprung member (12) is arranged to permit displacement of the collar (2), relative to the shaft (30), in a direction substantially perpendicular to the main axis of the collar (2).

13 Claims, 7 Drawing Sheets

(56) References Cited

U.S. PATENT DOCUMENTS

| | | | | |
|---|---|---|---|---|
| 4,906,109 A | * | 3/1990 | Balsells | F16J 9/062 |
| | | | | 277/589 |
| 5,428,960 A | * | 7/1995 | Hanaoka | B60T 11/236 |
| | | | | 277/500 |
| 5,505,545 A | * | 4/1996 | Mergler | F16C 17/035 |
| | | | | 384/215 |
| 5,758,545 A | | 6/1998 | Fevre et al. | |
| 5,868,500 A | * | 2/1999 | Bates | F16C 27/02 |
| | | | | 384/37 |
| 6,424,896 B1 | * | 7/2002 | Lin | B62D 6/10 |
| | | | | 180/6.2 |
| 6,485,180 B2 | * | 11/2002 | Mena | B62D 3/12 |
| | | | | 384/215 |
| 7,665,747 B2 | * | 2/2010 | Arlt | B62D 3/12 |
| | | | | 280/93.514 |
| 8,261,425 B2 | * | 9/2012 | Cymbal | B62D 1/185 |
| | | | | 280/775 |
| 9,279,450 B2 | * | 3/2016 | Zaike | F16C 27/063 |
| 2003/0174918 A1 | | 9/2003 | Suh et al. | |

\* cited by examiner

LINEAR BEARING

This invention relates to linear bearings for deployable structures.

Deployable structures such as push chairs, travel cots, rotary drying lines, deck chairs, gazebos, telescopic masts, etc, are constructed from a number of interlinked elements which move in a coordinated fashion in order to erect or collapse the structure. Such structures are prone to jamming when being erected or collapsed owing to their inability to accommodate local distortions in the structure, and the often low precision manufacture of shafts and sliding joints, e.g. which may be rough or non-linear. These reasons, among other factors, make deployable structures difficult or sometime impossible to deploy or stow.

Deployable structures often use sliding elements, e.g. linear bearings mounted on shafts, to aid the coordinated movement during deployment, but commonly these sliding elements are the cause of the jamming. A naive attempt to address this problem may be to improve the manufacturing and assembly tolerances of the structure but this only serves to reduce the structure's tolerance to distortion which in turn increases its prevalence to jamming. On the other hand, if a less precise construction is used this results in a loose structure which might not deploy in a predictable manner or possess good structural integrity, e.g. the structure is not able to bear heavy loads, is prone to distortion and is undesirably flexible once erected. Clearly this has a negative impact on the perceived quality of the product including the deployable structure. Another approach to alleviate the potential for jamming is to use ball bearings within a linear bearing, but these are expensive and are only effective when used with accurately manufactured, hard-surface material shafts.

The aim of the present invention is to provide improvements for such deployable structures.

When viewed from a first aspect the invention provides a linear bearing comprising a collar arranged to receive a shaft therethrough, and at least one resiliently sprung member mounted within the collar so as to contact the shaft when the shaft is mounted inside the collar, wherein the at least one resiliently sprung member is arranged to permit displacement of the collar, relative to the shaft, in a direction substantially perpendicular to the main axis of the collar.

The present invention therefore provides a compliant linear bearing which allows a degree of distortion in the structure at the location of the linear bearing. The resiliently sprung member, when a shaft is mounted inside the collar, contacts the shaft and moves in a direction substantially perpendicular to the main axis of the collar, i.e. in a direction substantially perpendicular to the direction of the shaft through the collar.

By allowing some relative displacement between the linear bearing and the shaft mounted therein, a deployable structure which includes the linear bearing is able to accommodate distortions and tolerances at the points where it is needed, i.e. where previously the structure jammed during deployment. Such distortions and tolerances may result from one or more of the structure's design, the loading of the structure during use, material surface characteristics and the structure's manufacturing and assembly process. Thus the compliance of the linear bearing aids the smooth deployment of the structure while still allowing the structure to retain its structural integrity.

As will be appreciated, preferably the linear bearing is suitable for use in a deployable structure and thus the invention extends to a deployable structure comprising at least one linear bearing as described herein and a shaft, wherein the linear bearing is mounted on the shaft. The linear bearing could be incorporated into a hollow tube, e.g. as part of a set of telescopic tested tubes, where each tube acts as a collar relative to an inner tube and a shaft relative to an outer tube.

The collar is arranged to receive a shaft therethrough and will generally allow movement of the shaft through the collar, e.g. an unlimited range of displacement, in a direction parallel to the main axis of the collar and the axis of the shaft, i.e. the direction in which the shaft is longitudinally extended. Preferably the collar is longitudinally extended in a direction parallel to the main axis of the collar, e.g. with the internal length of the collar (in a direction parallel to the main axis of the collar) being greater than the internal diameter of the collar (in a direction substantially perpendicular to the main axis of the collar). This enhances the collar's ability to guide the shaft through the collar, and thereby control its movement, as well as providing a reasonably sized mounting location for other components in the deployable structure.

The cross-sectional shape of the collar, i.e. in the plane perpendicular to the main axis of the collar, could be any suitable or desirable shape, e.g. elliptical or polygonal. In a preferred embodiment the cross-sectional shape of the collar is substantially circular. In addition the collar may comprise a groove and/or protrusion arranged to interact with a corresponding feature on the shaft, to prevent rotation of the shaft relative to the collar. Alternatively the collar can be arranged to allow rotation of the shaft relative to the collar.

The linear bearing could comprise only a single resiliently sprung member, however in a preferred set of embodiments the linear bearing comprises a plurality of resiliently sprung members, which are together arranged to permit displacement of the collar, relative to the shaft, in a direction substantially perpendicular to the main axis of the collar. Providing a plurality of resiliently sprung members helps to centre the shaft in the collar and more finely control the range and direction of displacements of the shaft relative to the collar, e.g. as a function of the load on the shaft, in order to align and balance the shaft in the collar. Preferably the linear bearing comprises two or more resiliently sprung members, e.g. four or more resiliently sprung members, e.g. eight or more resiliently sprung members, e.g. ten resiliently sprung members. Preferably the plurality of resiliently sprung members are equally spaced around the inner perimeter of the collar and thus be arranged to contact the shaft at points which are equally spaced around the inner perimeter of the collar.

The at least one resiliently sprung member could be arranged to contact the shaft at only a single longitudinal position (in a direction parallel to the main axis of the collar) of the collar, e.g. at the middle of the collar. However in a preferred embodiment the at least one resiliently sprung member is arranged to contact the shaft at at least a first and a second longitudinal position, wherein the at least first and second longitudinal positions are longitudinally spaced from each other (in a direction parallel to the main axis of the collar). Preferably the first and second longitudinal positions are closer to the respective ends of the collar than the midpoint of the collar, in a direction parallel to the main axis of the collar. Providing at least two longitudinally spaced positions at which the at least one resiliently sprung member contacts the shaft gives greater control over the range and direction of displacements of the shaft relative to the collar than just providing the at least one resiliently sprung member at a single longitudinal position, thus helping to align and support the shaft within the collar.

Each of the at least one resiliently sprung members could be arranged to contact the shaft at each of the at least first and second longitudinal positions. However in a preferred embodiment the linear bearing comprises a first and second sets of resiliently sprung members, wherein the first set of resiliently sprung members is arranged to contact the shaft at the first longitudinal position and the second set of resiliently sprung members is arranged to contact the shaft at the second longitudinal position, i.e. different resiliently sprung members are arranged to contact the shaft at each of the two or more longitudinally spaced positions.

Preferably each of the first and second sets of resiliently sprung members comprises a plurality of resiliently sprung members, e.g. two or more resiliently sprung members, e.g. three or more resiliently sprung members, e.g. five resiliently sprung members. It will be understood, in these embodiments, that although multiple resiliently sprung members may be arranged to contact the shaft at the same longitudinal position, they will generally be spaced around the inner perimeter of the collar and thus be arranged to contact the shaft at different points around the inner perimeter of the collar. Preferably the first set of resiliently sprung members comprises the same number of resiliently sprung members as the second set of resiliently sprung members.

The at least one resiliently sprung member could take any suitable or desirable form, e.g. a leaf spring, a compression spring, a torsion spring. However in a preferred embodiment the at least one resiliently sprung member comprises at least one cantilever spring, i.e. comprising a free end and a fixed end. Preferably the free end of each of the at least one cantilever spring is arranged to contact the shaft. In the embodiments which comprise a plurality of resiliently sprung members, preferably each of the plurality of resiliently sprung members comprises a cantilever spring. The fixed end(s) could be attached to the collar or to a part separate from the collar, e.g. a circlip. A cantilever spring is particularly suitable to function as the resiliently sprung member in the linear bearing of the present invention as there are multiple variables, e.g. the length, cross-sectional area, material, taper angle, area of contact with the shaft, which can be tuned to provide a reliable response, e.g. spring force, between the linear bearing and the shaft. This then gives a predictable deflection of the at least one cantilever spring for a given load thereon.

In the embodiments in which the at least one resiliently sprung member comprises at least one cantilever spring, with the free end of the cantilever spring being arranged to contact the shaft, preferably the free end of the cantilever spring comprises a protrusion arranged to contact the shaft. Providing a protrusion helps to control the surface area, for example, of the cantilever spring which contacts the shaft, and therefore enables the friction between the cantilever spring and the shaft to be controlled and tuned. Preferably the protrusion is the only part of the cantilever spring which is arranged to contact the shaft during use.

In one set of embodiments each of the at least one cantilever spring has a greater cross-sectional area at its fixed end than at its free end, i.e. it tapers along its length. This helps to control and tune the deflection of the cantilever spring. Preferably each of the at least one cantilever spring comprises a first portion proximate to the fixed end having a first cross-sectional area and a second portion proximate to the free end having a second cross-sectional area, wherein the first cross-sectional area is greater than the second cross-sectional area, e.g. there is a step change in cross-sectional area. Preferably the first portion and the second portion are of substantially equal length, e.g. the step change in cross-sectional area occurs approximately halfway along each of the at least one cantilever spring.

The change in cross-sectional area could be effected on each side of the cantilever spring, i.e. all the way around the perimeter of its cross section. However preferably the depth of the first portion of the at least one cantilever spring (the dimension of the cantilever spring in a radial direction substantially perpendicular to the main axis of the collar) is greater than the depth of the second portion of the cantilever spring, i.e. the difference in cross-sectional area is owing to the difference in depth between the first and second portions of the cantilever spring. Preferably the outer surface (distal from the centre of the linear bearing) of the first portion of the at least one cantilever spring is arranged to contact the inner surface of the collar and the outer surface of the second portion of the at least one cantilever spring is arranged to be spaced from the inner surface of the collar. In other words preferably the difference in depth between the first and second portions of the cantilever spring is owing to a difference in depth on the outer surface of the cantilever spring between the first and second portions. This allows deflection of the second portion of the cantilever spring (the free end) from approximately the midpoint of the cantilever spring to provide the necessary spring force.

It will be seen from the above that one or more of the attributes of the cantilever springs, e.g. the cross section and the length of the free end of the cantilever spring, the relaxed inner diameter, the space between the free end of the cantilever spring and the inner surface of the collar and the length of the bearing (e.g. the distance between the ends of the two sets of cantilever springs), can be controlled (taking into account the material properties of the cantilever spring) to tune the preload (when relaxed) and the force (when displacement occurs) applied by the cantilever spring at its point of contact with the shaft, and the maximum rotational and translational displacement of the linear bearing. Thus, by appropriately selecting the material for the cantilever spring, combined with a tunable pre-loading, results in predictable and repeatable characteristics of the linear bearing, e.g. its deflection and friction with the shaft.

In the embodiments in which the linear bearing comprises a first and second sets of resiliently sprung members, preferably the first set of resiliently sprung members comprises a first set of cantilever springs and the second set of resiliently sprung members comprises a second set of cantilever springs, wherein the first and second sets of cantilever springs are arranged to interleave each other, preferably in opposite directions, i.e. with the free ends of the first set of cantilever springs proximate to the fixed ends of the second set of cantilever springs and vice versa. This is a convenient way of achieving two longitudinally spaced points of contact with the shaft and a plurality of resiliently sprung members. Preferably the first set of cantilever springs is substantially identical to the second set of cantilever springs, preferably each cantilever spring in each set of cantilever springs is substantially identical, and preferably the first and second sets of cantilever springs are discrete parts thus making them easy to manufacture as only a single part needs to be designed and made. In one embodiment each cantilever spring comprises a quadrilateral cross-section, e.g. each cantilever has a cross-sectional area comprising a sector of an annulus such that when the first and second sets of cantilever springs interleave each other they together have a cross-sectional area comprising an annulus.

The at least one resiliently sprung member could be integral to the collar, i.e. the linear bearing could be a single (integral) piece comprising the collar and the at least one resiliently sprung member. This single piece could be integrally moulded or machined. However in a preferred embodiment the collar and the at least one resiliently sprung member are discrete parts, e.g. manufactured separately from each other. This allows the collar and the at least one resiliently sprung member to be made from different materials which are suitable for their functional purpose. Each part could be integrally moulded, e.g. injection moulded, or manufactured using an additive manufacturing process, e.g. 3D printing. Injection moulding may be suitable for the embodiment which comprises first and second sets of interleaving cantilever springs as there are gaps between the individual cantilever springs on each set to accommodate the cantilever springs on the other set. Preferably each part is individually machined as this helps to reduce the manufacturing tolerances.

The collar is preferably rigid, as this gives support to the rest of the deployable structure, for example so that other components of the deployable structure can be mounted thereto, e.g. other shafts. A suitable material can be metal, e.g. aluminium alloy. To aid the mounting of other components in the deployable structure to the collar, preferably the collar comprises a mounting bracket, e.g. eye lugs, which could be integrally formed with the collar or provided by a discrete part attached to the collar.

The at least one resiliently sprung member could be made from any suitable or desirable material which gives the necessary spring stiffness, e.g. this may also be metal. However in a preferred embodiment the at least one resiliently sprung member comprises a low-friction plastic, e.g. a thermoplastic, e.g. polyoxymethylene, such as is sold under the trade name Delrin®. These (thermo)plastics give a very predictable coefficient of friction with the shaft, even when used with a range of other materials. They are also non-hygroscopic so are very stable across a range of temperatures and humidities, and do not generally need lubrication.

In the embodiments in which the collar and the at least one resiliently sprung member are discrete parts, and the at least one resiliently sprung member comprises a plurality of resiliently sprung members, each of the resiliently sprung members could be provided as a discrete part. However preferably the plurality of resiliently sprung members are integrally formed into one or more sets of resiliently sprung members (which could correspond to the first and second sets of resiliently sprung members described above), each set comprising a plurality of resiliently sprung members. This simplifies this manufacturing, assembly and alignment of the linear bearing.

Furthermore, preferably the collar and the at least one resiliently sprung member comprise complementary features arranged to retain the at least one resiliently sprung member within the collar during normal use, e.g. a lip on the collar and a rib on the at least one resiliently sprung member. Alternatively or additionally the linear bearing can comprise one or more circlips, e.g. one at each end of the collar, again being arranged to retain the at least one resiliently sprung member within the collar during normal use. The one or more circlips could be provided as an integral part of the collar or the at least one resiliently sprung member, or it could be provided as a discrete part arranged to hold the at least one resiliently sprung member within the collar. Such arrangements allow the components of the linear bearing to be assembled, e.g. owing to their slight deformability such that the at least one resiliently sprung member can be pushed inside the collar, but then prevent them from coming apart during normal use, e.g. movement of the shaft within the linear bearing.

The collar and the at least one resiliently sprung member and/or one or more circlips could also be arranged to prevent the ingress of debris into the linear bearing, or the linear bearing could comprise an additional component for this purpose, e.g. protective sleeve, O-ring or bellows.

As discussed, the linear bearing will typically form part of a deployable structure, e.g. comprising one or more struts, and be arranged to be deployed from a stowed, collapsed state to an erected, unfurled state. The deployable structure may be arranged to be deployed by hand, e.g. as in conventional push chairs or travel cots, or may comprise a motor to drive the deployment, but in either case there will be movement of the shaft through the linear bearing of the present invention during deployment of the structure. In order to monitor the deployment of the structure, in one embodiment the linear bearing comprises a sensor, e.g. a strain gauge such as a strip type resistive strain gauge, arranged to provide feedback to a control system or passive monitoring system. The sensor enables, for example, stresses on the linear bearing, e.g. on the collar and/or the at least one resiliently sprung member, to be quantified. This allows the deployment of the structure, i.e. its movement, to be regulated and also monitored during repeated use, e.g. to check for wear of the linear bearing, with predictive monitoring being used for maintenance, e.g. to alert for parts wearing out. Furthermore, the control could also be operatively connected to the motor, where provided, to regulate the motor dependent on the measurement(s) fed back from the sensor(s). The measurement(s) from the sensor(s) could be correlated with one or more of operational variables from the motor, e.g. its power consumption and/or torque, in order to further analyse the operation of the linear bearing in the deployable structure.

The linear bearing can comprise a plurality of sensors, arranged on different parts of the linear bearing, e.g. the collar and on a plurality of the resiliently sprung members. For example sensors could be provided on one, or preferably each, of the sets of resiliently sprung members or even on each of the plurality of the resiliently sprung members in order to give a detailed analysis of the operation of the linear bearing.

In one embodiment the resiliently sprung members are arranged to act as a latch in cooperation with the shaft passing through the linear bearing. Preferably the protrusion at the free end of the cantilever spring is arranged to cooperate with corresponding grooves in the shaft, e.g. in the form of a ratchet. Enabling the resiliently sprung members to be used as a latch, e.g. at the end of, or during, deployment of the structure, allows the structure to be held in place in a partially or fully deployed position.

An embodiment of the invention will now be described, by way of example only, with reference to the accompanying drawings, in which.

Figure 3A:
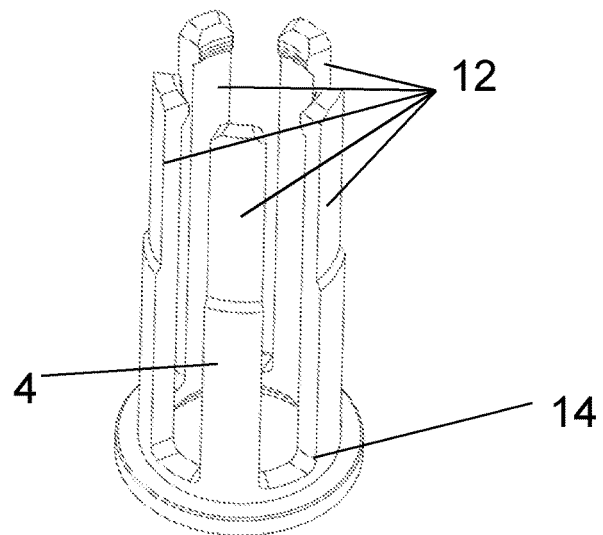
Figure 3B:
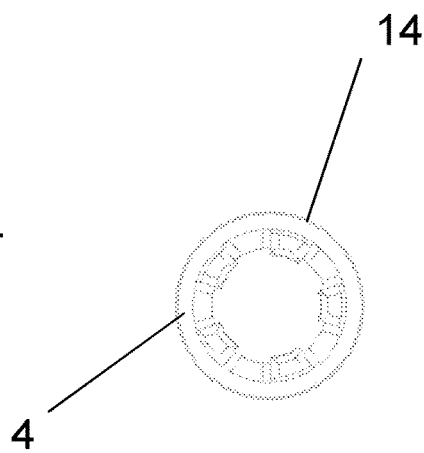
Figure 3C:
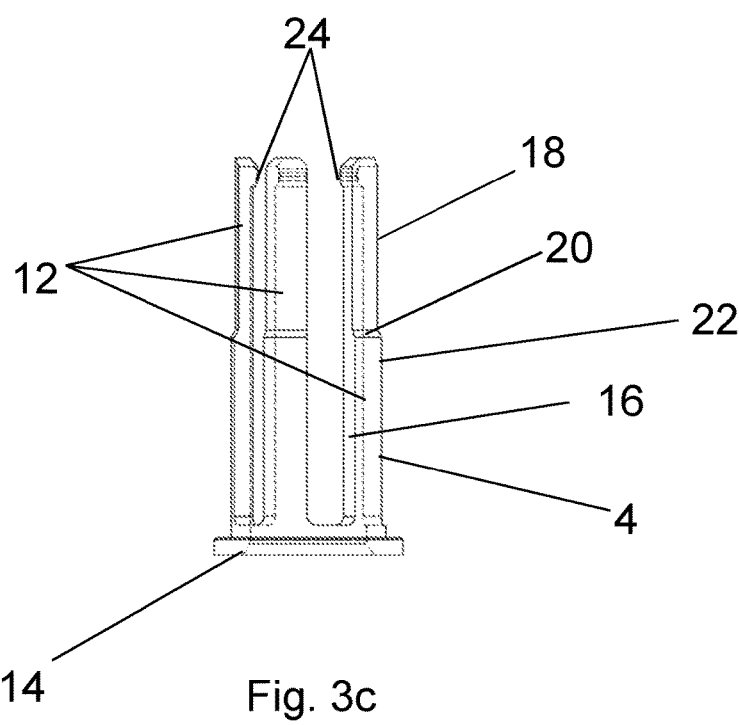
Figure 4A:
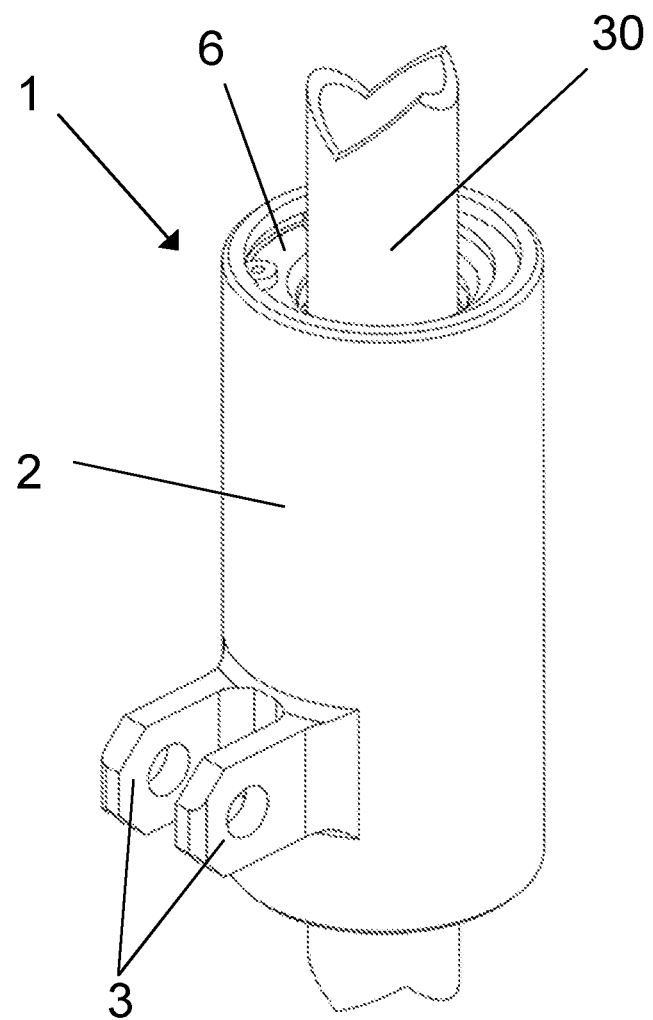
Figure 4B:
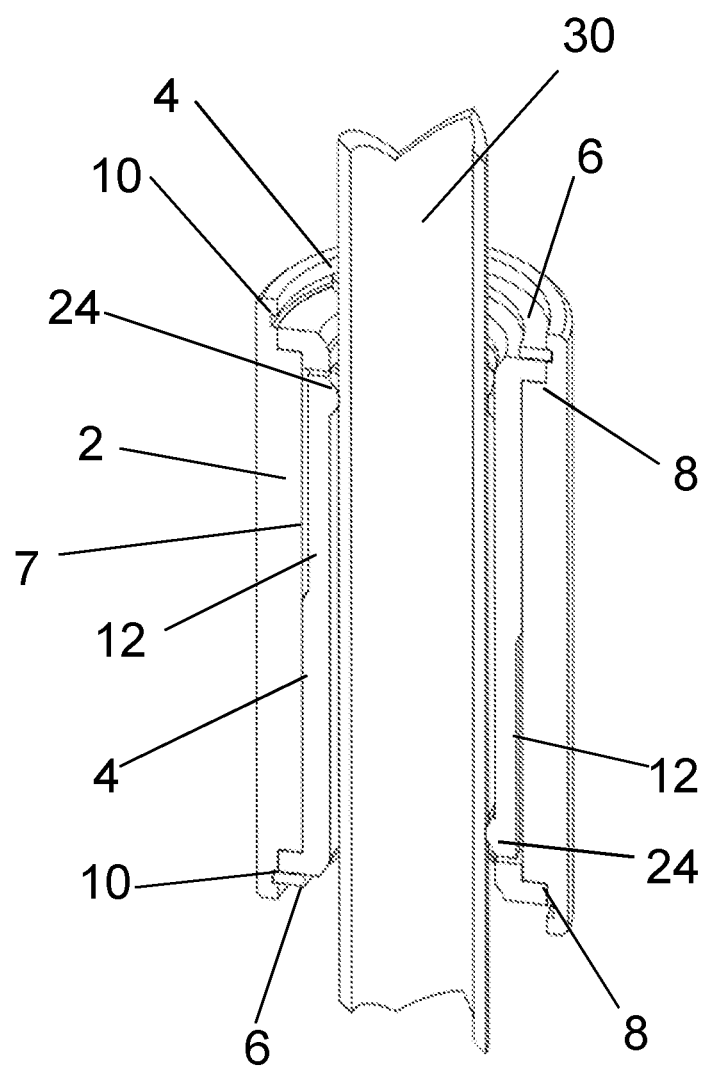
Figure 4C:
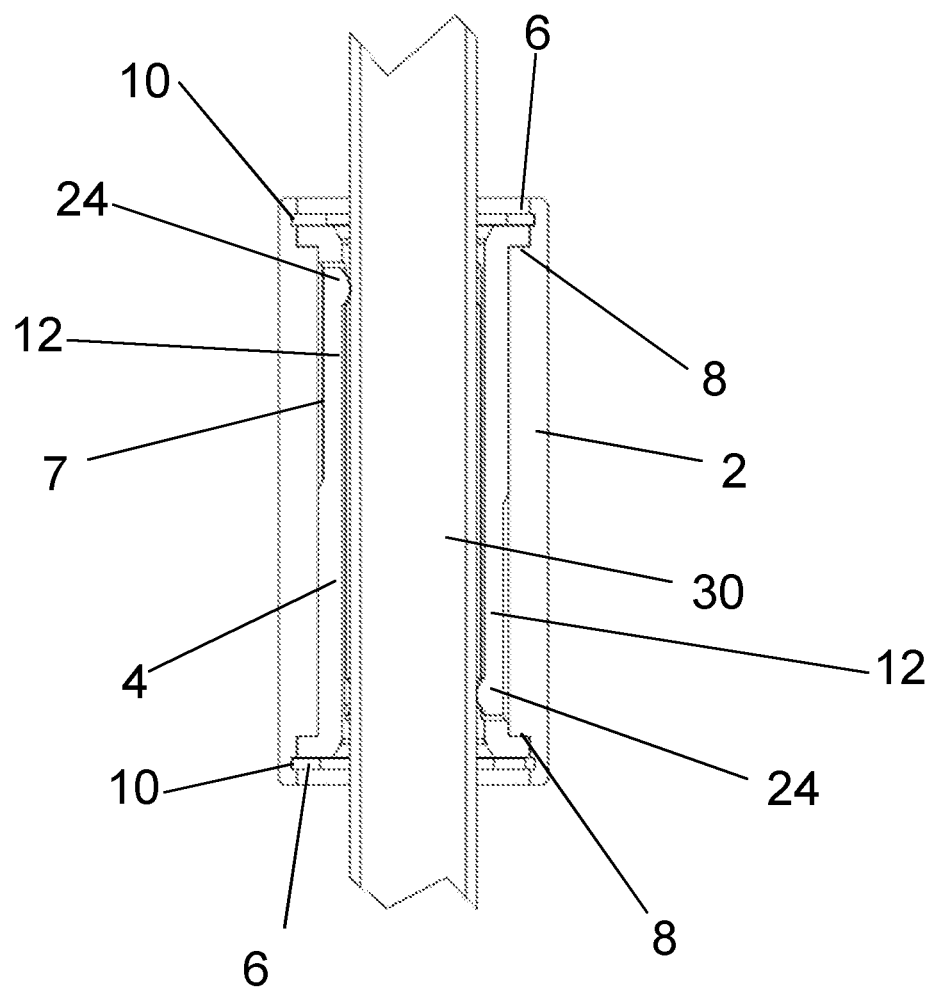

FIGS. 3a, 3b and 3c show different views of the cantilever springs of the linear bearing in FIGS. 1a, 1b, 1c and 1d; and FIGS. 4a, 4b and 4c show different views of the linear bearing in FIGS. 1a, 1b, 1c and 1d with a shaft passing therethrough.

Figure 1A:
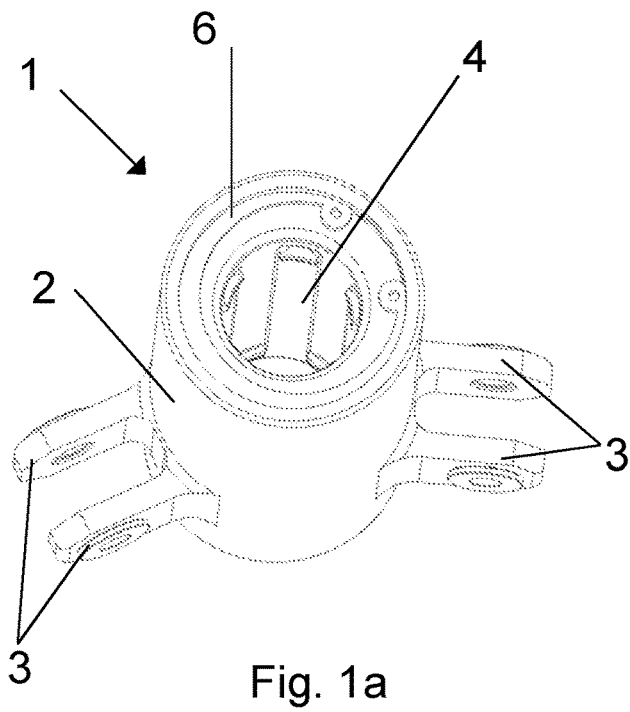
FIGS. 1a, 1b, 1c and 1d show different views of a linear bearing in accordance with an embodiment of the invention.
Figure 1B:
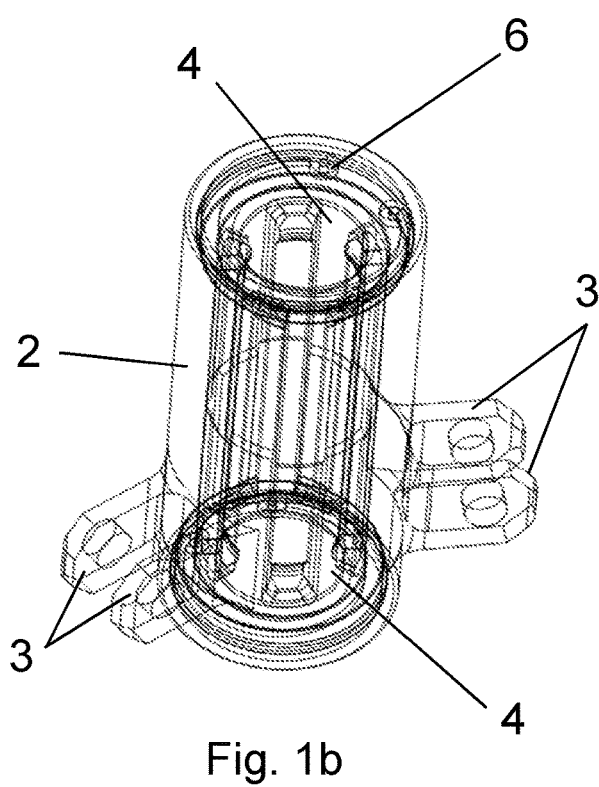
Figure 2A:
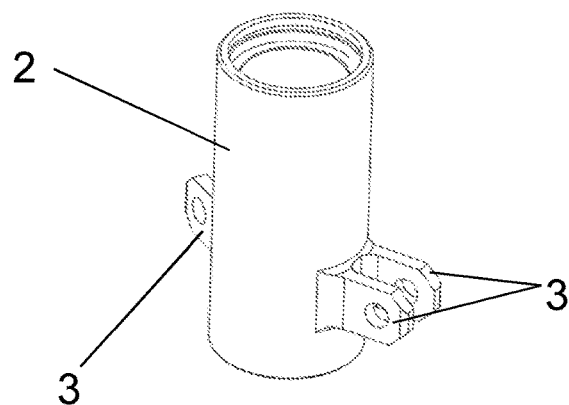
FIGS. 2a, 2b and 2c show different views of the collar of the linear bearing in FIGS. 1a, 1b, 1c and 1d.
Figure 2B:
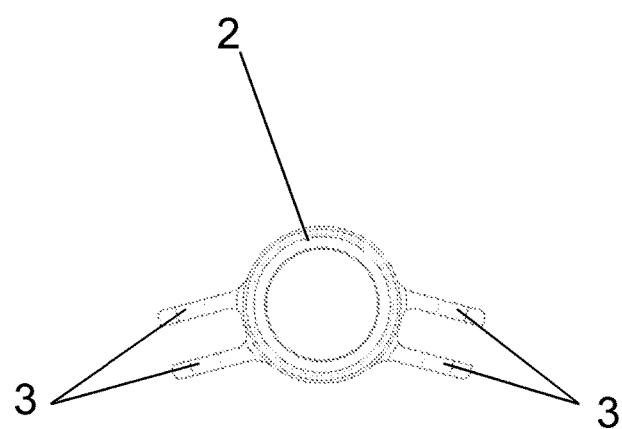
Figure 2C:
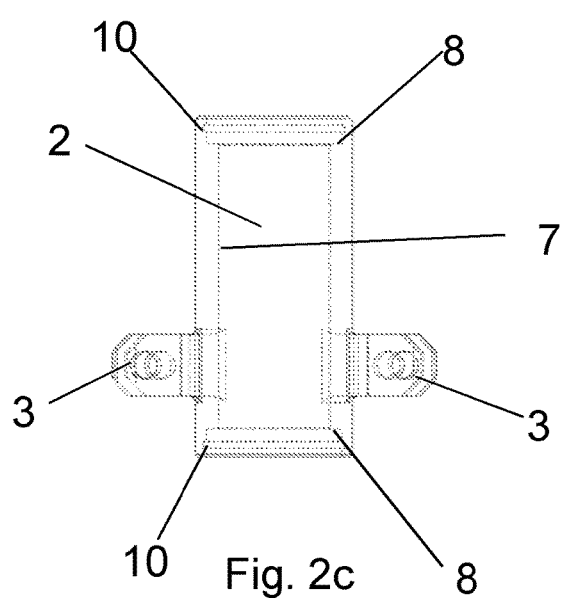

FIGS. 1a and 1b each show a perspective view of a linear bearing 1 in accordance with an embodiment of the invention, with FIG. 1b showing the outer collar 2 as translucent. The linear bearing 1 comprises an outer collar 2 which is a hollow cylinder of circular cross section, made from aluminium alloy. The outer collar 2 is also shown in detail in FIG. 2a which shows a perspective view of the collar 2, FIG. 2b which shows a plan view along the main axis of the collar 2, and FIG. 2c which shows a side view of the collar 2. Two pairs of eye lugs 3 are formed on the outside of the collar 2 to provide mounting locations for other components in a deployable structure.

Figure 1C:
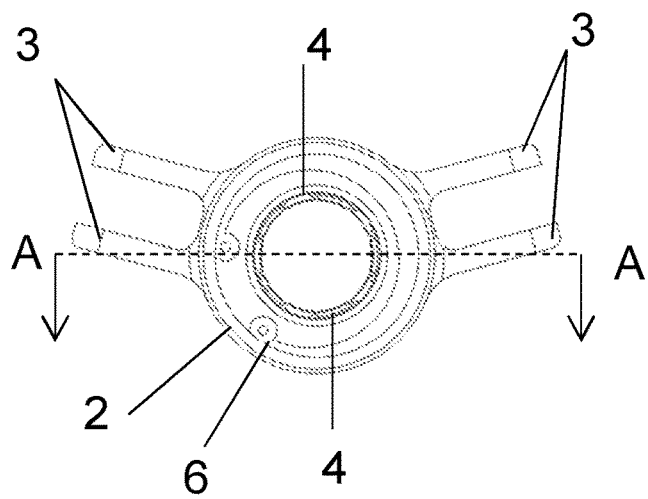
Figure 1D:
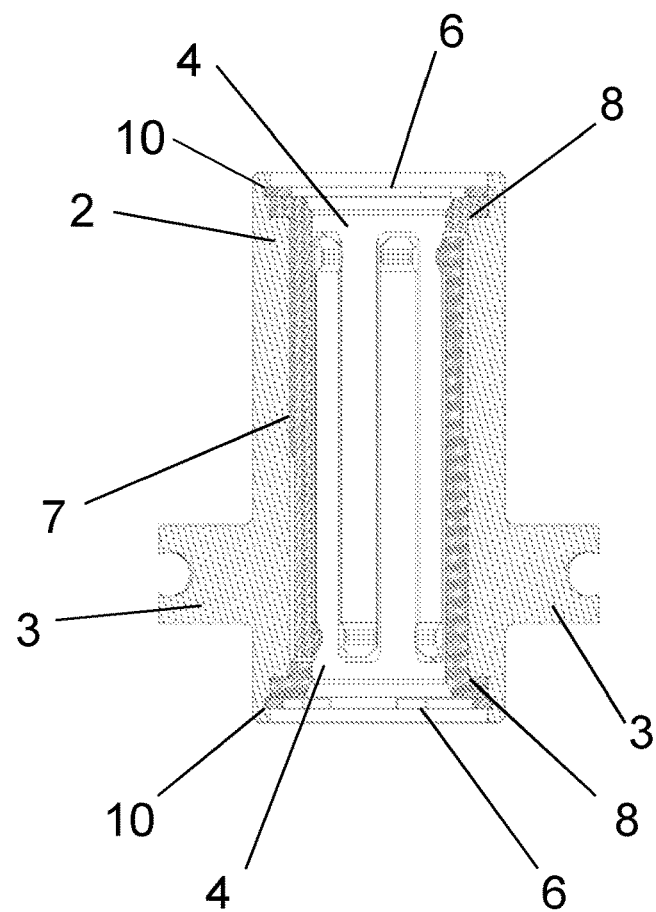

The inside of the linear bearing 1 can be seen in more detail in the plan view of FIG. 1c along the main axis of the collar 2 and the cross-sectional view of FIG. 1d along the line A-A in FIG. 1c. Inside the collar 2 is housed a pair of sets of interleaving cantilever springs 4 which are retained within the collar 2 by a pair of circlips 6. One set of cantilever springs 4 is shown in more detail in the perspective view of FIG. 3a, the plan view of FIG. 3b and the side view of FIG. 3c.

The inner surface 7 of the collar 2 is of constant circular cross-section for the majority of its length but a pair of rims 8 is provided towards each end of the collar 2 to receive the pair of sets of cantilever springs 4, and a pair of grooves 10 is provided between the pair of rims 8 and each end of the collar 2 to receive the pair of circlips 6. The circlips 6 fit into the groove 10, so must be pushed to snap into place (thus temporarily deforming the circlips 6), such that they retain the pair of sets of interleaving cantilever springs 4 within the collar 2.

The pair of sets of cantilever springs 4 are identical to each other, with one of the sets being shown in more detail in FIGS. 3a, 3b and 3c. Each set of cantilever springs 4 comprises five individual cantilever springs 12 which are fixed at one end to a mounting ring 14 and free at the other end. Each cantilever spring 12 is identical and has a substantially quadrilateral cross-sectional area for the majority of its length such that when the pair of sets of cantilever springs 4 are pushed together in opposite directions, the cantilever springs 12 on each set of cantilever springs 4 interleave each other, as can be seen in FIGS. 1b, 1c and 1d.

Each cantilever spring 12 has a first portion 16 proximate the fixed end which has a cross-sectional area that is greater than the corresponding cross-sectional area of the second portion 18 proximate the free end. This reduction in cross-sectional area towards the free end of the cantilever spring occurs approximately halfway along each cantilever spring 12 in a step 20 in the outer face 22 of each cantilever spring 12. When the pair of sets of cantilever springs 4 are assembled inside the collar 2, the outer face 22 of each cantilever spring 12 in the first portion 16 is flush against the inner surface 7 of the collar 2, but the outer face 22 in the second portion 18 of each cantilever spring 12 is spaced from the inner surface 7 of the collar 2, thus allowing deflection of the second portion 18 of each cantilever spring 12 towards the inner surface 7 of the collar 2.

At the free end of each cantilever spring 12 a protrusion 24 is provided which projects towards the centre of the linear bearing 1 from the end of the cantilever spring 12. When the linear bearing 1 is assembled as part of a deployable structure it is the inward surface of the protrusion 24 which contacts a shaft passing through the linear bearing.

FIGS. 4a, 4b and 4c show the linear bearing 1 assembled on a shaft 30. FIG. 4a shows a perspective view, FIG. 4b shows a perspective cross-section view and FIG. 4c shows a side-on cross-section view. The shaft 30 passes through the linear bearing 1 such that the protrusion 24 on each cantilever spring 12 contacts, and thus centres, the shaft in the middle of the linear bearing 1.

In operation, the shaft 30 forms part of a larger deployable structure, e.g. the linear bearing 1 can be attached to other shafts via the eye lugs 3 on the collar 2. As the structure is deployed or stowed, the various components of the structure move relative to each other such that the shaft 30 moves through the linear bearing 1. Owing to this movement, the structure may distort, such that the shaft 30 moves relative to the linear bearing 1, or the shaft 30 may not be perfectly straight or have a constant cross-sectional area owing to low manufacturing tolerances or damage.

Both of these effects result in the shaft 30 exerting a force on, and thus displacing, one or more of the cantilever springs 12, via the protrusions 24 at the free ends of the cantilever springs 12, such that the relative movement or low tolerance of the shaft 30 is accommodated. Owing to their stiffness, the cantilever springs 12 will exert a reactionary force on the shaft 30 thus balancing it within the linear bearing 1 and enabling the deployable structure to be deployed or stowed without jamming.

It can be seen from the above that the in at least preferred embodiments of the linear bearing, a compliant linear bearing is provided which allows a degree of distortion in the structure at the location of the linear bearing. By allowing some relative displacement between the linear bearing and the shaft mounted therein, a deployable structure which includes the linear bearing is afforded some distortion at the points where it is needed, i.e. where previously the structure jammed during deployment. Thus the compliance of the linear bearing aids the smooth deployment of the structure while still allowing the structure to retain its structural integrity.

The invention claimed is:

1. A linear bearing, comprising:
   a collar arranged to receive a shaft therethrough and defined around a main axis; and
   first and second sets of cantilever springs that interleave each other, comprise fixed and free end portions, and are mounted within said collar so as to contact said shaft at first and second positions when said shaft is mounted inside said collar, wherein said first and second positions are longitudinally spaced from each other, and wherein said first and second sets of cantilever springs are arranged so as to permit displacement of said collar, relative to said shaft, in a direction substantially perpendicular to said main axis of said collar.

2. The linear bearing as claimed in claim 1, wherein:
   said collar is longitudinally extended in a direction parallel to said main axis of said collar.

3. The linear bearing as claimed in claim 1, wherein:
   said collar has a cross-sectional shaped which is substantially circular.

4. The linear bearing as claimed in claim 1, wherein:
   said free end portion of each one of said first and second sets of cantilever springs comprises a protrusion arranged to contact said shaft.

5. The linear bearing as claimed in claim 1, wherein:
   each one of said first and second sets of cantilever springs comprises a first portion proximate to said fixed end of said cantilever spring having a first cross-sectional area, and a second portion proximate to said free end of said cantilever spring having a second cross-sectional area, wherein said first cross-sectional area is greater than said second cross-sectional area.

6. The linear bearing as claimed in claim 1, wherein:

each one of said first and second sets of cantilever springs comprises a first portion proximate to said fixed end of said cantilever spring which contacts an inner surface portion of said collar and a second portion proximate to said free end of said cantilever spring which is spaced from said inner surface portion of said collar.

7. The linear bearing as claimed in claim 1, wherein: said collar and said first and second sets of cantilever springs comprise discrete parts.

8. The linear bearing as claimed in claim 1, wherein: said collar is rigid.

9. The linear bearing as claimed in claim 1, wherein: said collar comprises a mounting bracket.

10. The linear bearing as claimed in claim 1, wherein: said first and second sets of cantilever springs comprise a low friction plastic.

11. The linear bearing as claimed in claim 1, wherein: said collar and said first and second sets of cantilever springs comprise complementary features arranged to retain said first and second sets of cantilever springs within said collar during normal use.

12. The linear bearing as claimed in claim 1, further comprising:
one or more circlips arranged to retain said first and second sets of cantilever springs within said collar during normal use.

13. A deployable structure, comprising:
at least one linear bearing; and
a shaft;
wherein said at least one linear bearing is mounted on said shaft, wherein said at least one linear bearing comprises a collar, having a main axis, that receives the shaft therethrough, and first and second sets of cantilever springs that interleave each other and are mounted within said collar so as to contact the shaft at first and second positions inside the collar, wherein said first and second positions are longitudinally spaced from each other, and wherein said first and second sets of cantilever springs are arranged so as to permit displacement of said collar, relative to said shaft, in a direction substantially perpendicular to said main axis of said collar.

* * * * *